United States Patent [19]

Markwardt et al.

[11] Patent Number: 4,774,100

[45] Date of Patent: Sep. 27, 1988

[54] METHOD FOR THE BATCHWISE PRODUCTION OF AERATED SWEETS IN A PRESSURE-BEATING MACHINE

[75] Inventors: Klaus Markwardt, Laatzen; Reinhard Mergelsberg, Garbsen, both of Fed. Rep. of Germany

[73] Assignee: Otto Hänsel GmbH, Hanover, Fed. Rep. of Germany

[21] Appl. No.: 894,259

[22] Filed: Aug. 7, 1986

[30] Foreign Application Priority Data

Aug. 9, 1985 [DE] Fed. Rep. of Germany ....... 3528637

[51] Int. Cl.⁴ .......................... A23G 3/00; A23G 3/02
[52] U.S. Cl. .................... 426/572; 426/660; 426/474; 366/105; 366/107; 99/348
[58] Field of Search .............. 426/572, 660, 474, 476, 426/519, 510, 564; 99/348; 366/105, 107

[56] References Cited

U.S. PATENT DOCUMENTS

| | | | |
|---|---|---|---|
| 3,557,717 | 1/1971 | Chivers | 426/474 |
| 4,195,935 | 4/1980 | Sollich | 426/572 |
| 4,418,409 | 11/1983 | Bouette | 426/572 |
| 4,470,998 | 9/1984 | Paget | 426/660 |
| 4,487,118 | 12/1984 | Hansel et al. | 426/510 |
| 4,666,730 | 5/1987 | Mergelsberg | 426/572 |

*Primary Examiner*—Jeanette Hunter
*Attorney, Agent, or Firm*—Max Fogiel

[57] ABSTRACT

The invention concerns a method for the batchwise production of aerated sweets in a pressure-beating machine, wherein—according to the invention—the sugar mass to be aerated is boiled with the omission of an underpressure treatment, is conducted to the pressure-beating container and brought in this to the required residual water content and the required further processing temperature at underpressure before the beating, whereupon a beating of the mass takes place in the pressure-beating machine.

6 Claims, 1 Drawing Sheet

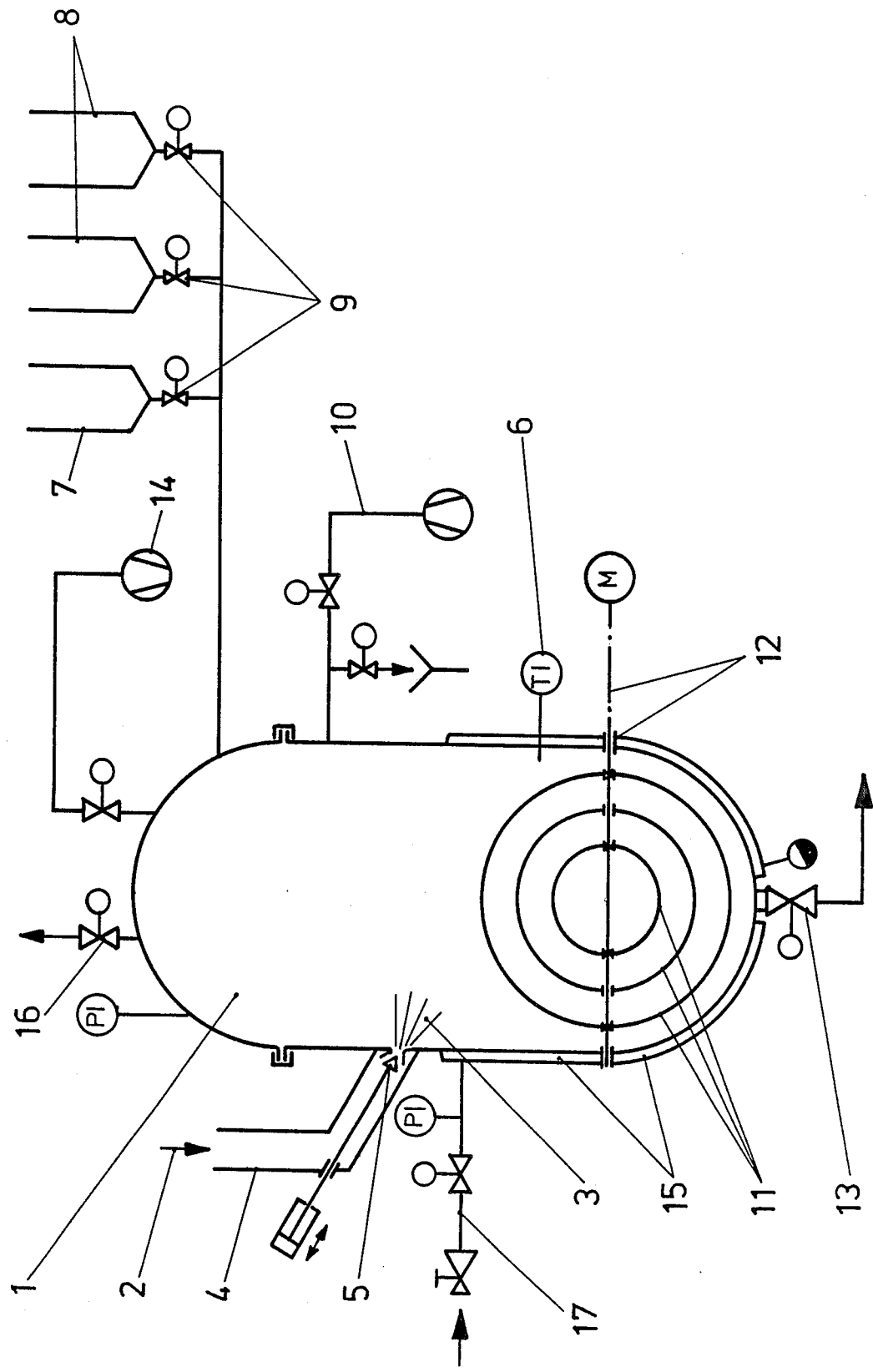

METHOD FOR THE BATCHWISE PRODUCTION OF AERATED SWEETS IN A PRESSURE-BEATING MACHINE

The invention concerns a method and a device for the batchwise production of aerated sweets in a pressure-beating machine. Methods and devices of that kind are already known in practice in the most diverse forms of embodiment and described in the relevant literature. For this purpose, "Handbuch für die Zuckerwaren Silesia Confiserie Manual Number 1 of Meiners +Joike, 1969, pages 417 et seq." may be referred to. In every case, one operates on about the same principle.

A sugar solution brought in a preparatory machine to the final dry substance proportion and to the processing temperature, usually through boiling and underpressure treatment, is to be so treated under pressure together with a beating medium solution in common or one after the other that the gas, preferably air, required for the attainment of low specific weights and the desired consistency is worked homogeneously into the mass.

The demanded residual water content connected with the required processng temperature determines the usually applied process course, i.e. boiling of the sugar solution and the simultaneous or subsequent underpressure treatment (boiling point reduction). Due to the underpressure treatment, temperature lowering through water evaporation, the sugar mass has a high viscosity which must be taken into account during the feeding to the pressure-beating machine. Large cross-sections in the feed tube ducts, large fittings and in part pressure enhancement are required in order not to let the charging times become too great. An upstream boiling apparatus must in the boiler space be designed to be so large that it affords sufficient space for the sugar mass foaming under underpressure.

It is the task of the invention to indicate an improved method, which functions free of trouble, necessitates a simplified machine installation and at the same time increases the throughput per unit time (through processes devolving in parallel), with maintenance of the same quality parameters of the finished product.

This problem is solved according to the invention thereby, that the sugar mass to be aerated is boiled with the omission of an underpressure treatment, is conducted to the pressure-beating container and brought in this to the required residual water content and the required further processing temperature at underpressure before the beating, whereupon a beating of the mass takes place in an in itself known manner.

The pressure-beating machine is charged with a boiled mass of low viscosity and not yet treated by underpressure. The underpressure treatment is redisposed into the pressure container of the beating machine and runs in parallel with the introduction of the sugar mass. This entails the advantages that the underpressure takes over the conveying of the mass and that the mass entering into the underpressure container is sprayed and the water evaporation thereby takes place more effectively through underpressure.

Whilst it is already known in the production of hard boiled sweets to undertake the spraying of boiled sugar mass on entry into a space standing under underpressure, the use of such a method step in the production of, for example, foam sugar masses, which are beaten after spraying and after underpressure treatment, is quite new and inventive.

Further details of the equipment operating by the method according to the invention are reproduced in the attached drawing and mentioned in the claims regarding the device.

The upstream boiling apparatus can be kept smaller in terms of volume, since the foaming-up of the mass at underpressure disappears. The same applies to the fittings and pipe ducts 4 between the boiling apparatus and the beating machine, since the mass is still of low viscosity in this region.

After the introduction of the boiled sugar mass into the beating machine by vacuum enhancement or also only through gravity, the inlet valve 5 is closed and a further underpressure treatment could follow. The process is monitored by a temperature sensor introduced at a suitable place.

Since the beater pressure container is designed in terms of volume for highly aerated sweets, sufficient space offers itself for the sugar mass foaming up at underpressure.

With the aid of the underpressure, the beating medium solution 7 and possibly other ingredients 8 are sucked into the pressure container after opening of the inlet valves 9. The actual beating process takes place through filling of the beater space with the beater gas (air) 10 standing under pressure and rotation of the beater basket 11.

In summary, it may be stated once again that the still unboiled sugar mass is put into the pressure-beating container without spray effect by way of the inlet valve. The steam filled into the double shell of the same effects the boiling of the sugar mass. The vapour valve is closed only thereafter and the underpressure treatment for the purpose of attainment of the required residual water content and the processing temperature is initiated. Finally, the aeration of the mass under internal excess pressure takes place through inducting the additional ingredients, such as for example aromatic substances, beating media or the like, into the container of the beater machine.

The emptying of the container after the beating takes place in known manner by way of the outlet valve 13 with the aid of the beater pressure.

We claim:

1. A method for batchwise production of aerated sugar masses in a pressure beating machine, comprising the steps of: boiling a sugar solution to be aeerated in a separate cooker at atmospheric pressure without subsequent vacuum treatment in said cooker; transferring the boiled solution into a connected pressure beating machine and vacuumizing said solution in said pressure beating machine by an additional boiling under vacuum to obtain a substantially viscous sugar mass; mixing said solution in said pressure beating machine after vacuumizing with added whipping agent solution; beating thereafter the mixed solution in said pressure beating machine and adding compressed air to produce an aerated sugar mass comprises substantially of cooked and vacuumized sugar solution, whipping agent solution, and air; said vacuumizing and said beating being carried out only in said pressure beating machine.

2. A method as defined in claim 1, including the step of spraying the cooked sugar solution to be vacuumized and drawing by vacuum the sprayed solution into said pressure beating machine.

3. A method as defined in claim 1, including the step of drawing by vacuum additional ingredients into said pressure beating machine.

4. A method as defined in claim 3, wherein said additional ingredients include flavoring solutions.

5. A method as defined in claim 3, wherein said additional ingredients include aromatic ingredients.

6. A method as defined in claim 1, wherein said pressure beating machine is a steam-heated cooker for sugar solutions with a double jacket at the bottom of said pressure beating machine for steam heating; said transferring sugar solutions which after cooking are vacuumized and beaten into separate further processing means, and providing for escape of evaporation vapors at said pressure beating machine.

* * * * *